US011803470B2

(12) United States Patent
Apte et al.

(10) Patent No.: US 11,803,470 B2
(45) Date of Patent: Oct. 31, 2023

(54) MULTI-LEVEL CACHE COHERENCY PROTOCOL FOR CACHE LINE EVICTIONS

(71) Applicant: Advanced Micro Devices, Inc., Santa Clara, CA (US)

(72) Inventors: Amit Apte, Austin, TX (US); Ganesh Balakrishnan, Austin, TX (US); Ann Ling, Santa Clara, CA (US); Vydhyanathan Kalyanasundharam, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/130,905

(22) Filed: Dec. 22, 2020

(65) Prior Publication Data

US 2022/0100661 A1 Mar. 31, 2022

Related U.S. Application Data

(60) Provisional application No. 63/083,810, filed on Sep. 25, 2020.

(51) Int. Cl.
*G06F 12/0817* (2016.01)

(52) U.S. Cl.
CPC .... *G06F 12/0828* (2013.01); *G06F 2212/621* (2013.01)

(58) Field of Classification Search
CPC .................. G06F 12/0828; G06F 2212/621
See application file for complete search history.

(56) References Cited

U.S. PATENT DOCUMENTS

| 9,852,073 | B2 * | 12/2017 | Peterson | .......... H04L 5/0032 |
| 2003/0018856 | A1 * | 1/2003 | Rowlands | .......... G06F 12/0859 |
| | | | | 711/135 |
| 2011/0219381 | A1 * | 9/2011 | Ahn | .......... G06F 12/08 |
| | | | | 718/104 |
| 2012/0079204 | A1 * | 3/2012 | Chachad | .......... H03M 13/2903 |
| | | | | 711/130 |
| 2013/0047163 | A1 * | 2/2013 | Marathe | .......... G06F 11/3608 |
| | | | | 718/104 |
| 2013/0326114 | A1 * | 12/2013 | Goss | .......... G06F 12/0246 |
| | | | | 711/E12.008 |
| 2014/0040561 | A1 * | 2/2014 | Lih | .......... G06F 12/0831 |
| | | | | 711/146 |
| 2014/0115272 | A1 * | 4/2014 | Pierson | .......... G06F 13/30 |
| | | | | 711/146 |
| 2016/0350219 | A1 | 12/2016 | Tune et al. | |
| 2017/0357583 | A1 * | 12/2017 | Boyer | .......... G06F 12/084 |

(Continued)

FOREIGN PATENT DOCUMENTS

JP 2006179034 A 7/2006

OTHER PUBLICATIONS

Miller, Douglas W., and David T. Harper III. "Performance analysis of disk cache write policies." Microprocessors and Microsystems 19.3 (1995): 121-130. (Year: 1995).*

(Continued)

*Primary Examiner* — Nicholas J Simonetti
(74) *Attorney, Agent, or Firm* — FIG. 1 Patents (57) ABSTRACT

Disclosed are examples of a system and method to communicate cache line eviction data from a CPU subsystem to a home node over a prioritized channel and to release the cache subsystem early to process other transactions.

20 Claims, 8 Drawing Sheets

(56) References Cited

U.S. PATENT DOCUMENTS

| | | | |
|---|---|---|---|
| 2019/0243568 A1* | 8/2019 | Burns | G06F 3/0637 |
| 2019/0266091 A1 | 8/2019 | Robinson et al. | |
| 2020/0081844 A1 | 3/2020 | Kalyanasundharam et al. | |
| 2021/0117200 A1* | 4/2021 | Eyole | G06F 9/3836 |

OTHER PUBLICATIONS

Ghandeharizadeh, Shahram, and Hieu Nguyen. "Design, implementation, and evaluation of write-back policy with cache augmented data stores." Proceedings of the VLDB Endowment 12.8 (2019): 836-849. (Year: 2019).*

Huang, Cheng-Chieh, et al. "C 3 d: Mitigating the NUMA bottleneck via coherent DRAM caches." 2016 49th Annual IEEE/ACM International Symposium on Microarchitecture (Micro). IEEE, 2016. (Year: 2016).*

International Search Report and Written Opinion, Application No. PCT/US2021/051009 dated Jan. 18, 2022.

PCT/US21/51009, "International Preliminary Report on Patentability", PCT Application No. PCT/US21/51009, Apr. 6, 2023, 10 pages.

* cited by examiner

MULTI-LEVEL CACHE COHERENCY PROTOCOL FOR CACHE LINE EVICTIONS

RELATED APPLICATIONS

This application claims priority to U.S. Provisional Application No. 63/083,810, filed on Sep. 25, 2020, which is incorporated by reference herein in its entirety.

BACKGROUND

Modern computing systems have multiple central processing units (CPUs) that typically include and rely on multiple caches in a cache hierarchy to improve processor and memory performance. Compared to main memory, a cache is a smaller and faster memory device that stores data that is frequently accessed or expected to be used in the near future so that the data can be accessed with low latency. Such cache devices are often implemented in static random access memory (SRAM) and are typically located between a processing unit that issues memory requests and the main memory device. A memory-side cache is a dedicated cache attached to a particular memory device or partition that caches data being written to and read from the memory device by other devices.

Cache subsystems in a computing system include high-speed cache memories configured to store blocks of data. As used herein, a "block" is a set of bytes stored in contiguous memory locations, which are treated as a unit for coherency purposes. As used herein, each of the terms "cache block", "block", "cache line", and "line" is interchangeable. In some embodiments, a block can also be the unit of allocation and deallocation in a cache. The number of bytes in a block is varied according to design choice, and may vary in size.

In multi-node computer systems, special precautions must be taken to maintain coherency of data that is being used by different processing nodes. For example, if a processor attempts to access data at a certain memory address, it must first determine whether the memory is stored in another cache and has been modified. To implement this cache coherency protocol, caches typically contain multiple status bits to indicate the status of the cache line to maintain data coherency throughout the system. One coherency protocol, for example, is the "MOESI" protocol, where each letter represents a state of the cache line. These states are as follows: the cache line has been modified (M), that the cache line is exclusive (E) or shared (S), or that the cache line is invalid (I). The owned (O) state indicates that the line is modified in one cache, that there may be shared copies in other caches, and that the data in memory is stale. Each cache line includes status bits in a cache directory, which keeps track of the cache lines that are currently in use by the system, to indicate which MOESI state the line is in.

BRIEF DESCRIPTION OF THE DRAWINGS

The embodiments illustrated in the figures of the accompanying drawings herein are by way of example and not by way of limitation. In the drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

Often data stored in a cache subsystem is no longer utilized on a regular basis and the cache line of data may be marked for eviction, which means the cache line, sometimes called a "victim", is cleared from the cache subsystem to make room for a new cache line. The cache line, or victim, being evicted may be "dirty" or "clean". If the victim cache line is dirty, that means data within the victim has been modified and the memory should be updated with the most current copy prior to purging the victim from the cache and associated buffers.

Executing a dirty or clean cache line eviction from the cache involves multiple operations that compete with other transactions. The operations for each transaction are typically performed in a serial fashion and are in a prioritized queue as data and signals interact amongst various interface blocks within the system. The execution scheme for an eviction transaction occupies resources at both the cache subsystem and other computer system interface blocks to preserve cache coherency. Therefore, the lifetime or occupancy of the transaction greatly increases depending on the distance between the cache subsystem and other computer system interface blocks. This occupancy may create a bottleneck in large systems with multiple CPU clusters where each cluster has its own cache subsystem and associated system interface blocks that spread across multiple sockets. For simplicity, the embodiments described herein will refer to dirty cache line evictions. However, the processes and systems are also applicable to clean cache line evictions.

Figure 1:
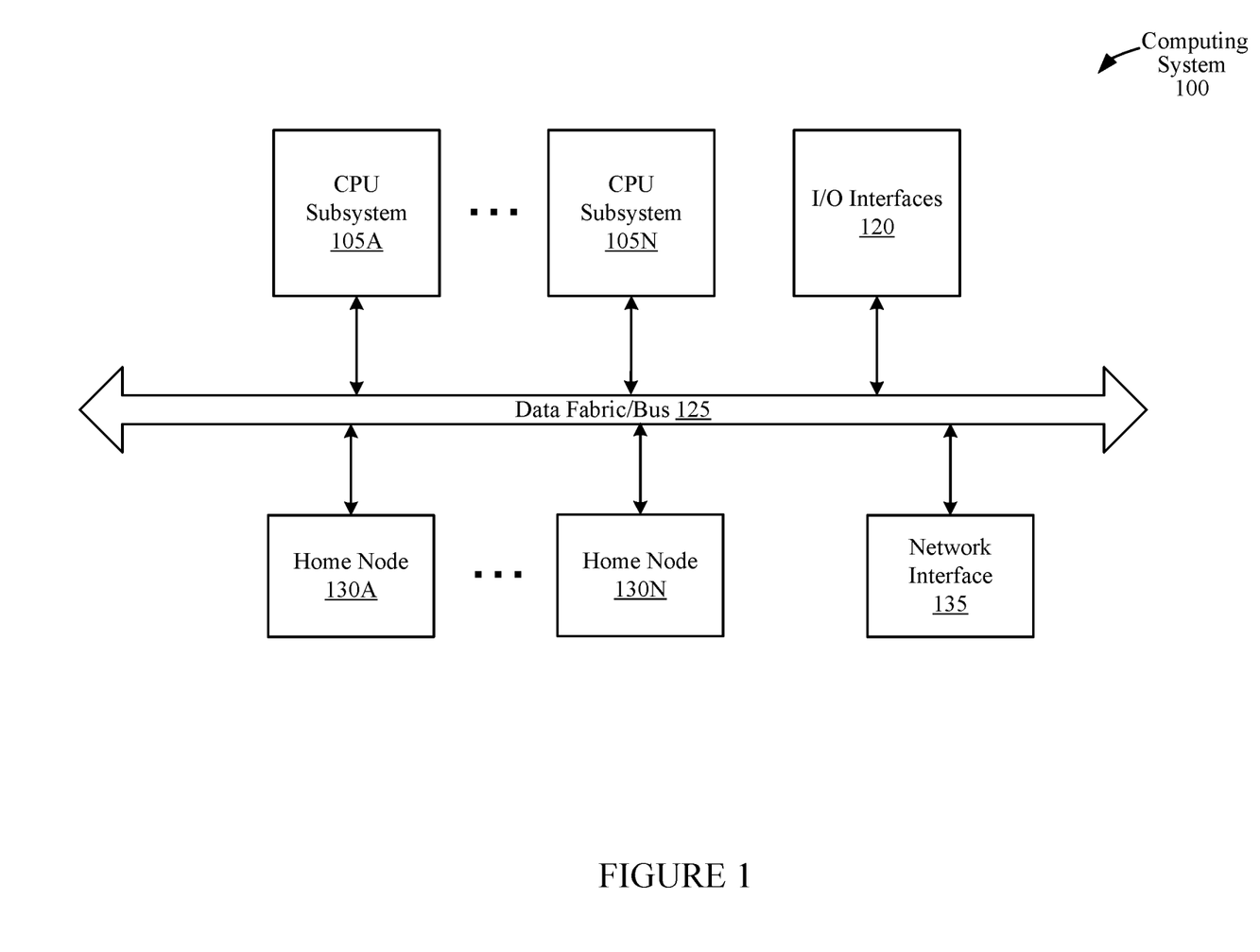
FIG. 1 is a block diagram of one embodiment of a computing system.

FIG. 1 is a block diagram of a computing system 100, according to one embodiment, to perform more efficient cache line transactions, such as a dirty or clean cache line evictions. In one embodiment, the computing system 100 includes multiple CPU subsystems 105A-N, input/output (I/O) interfaces 120, data fabric/bus 125, multiple home nodes 130A-N, and network interface 135. In other embodiments, computing system 100 may include other components and/or be arranged in other configurations. For clarity, as used herein, a "core complex" may also be called a "CPU".

Figure 2:
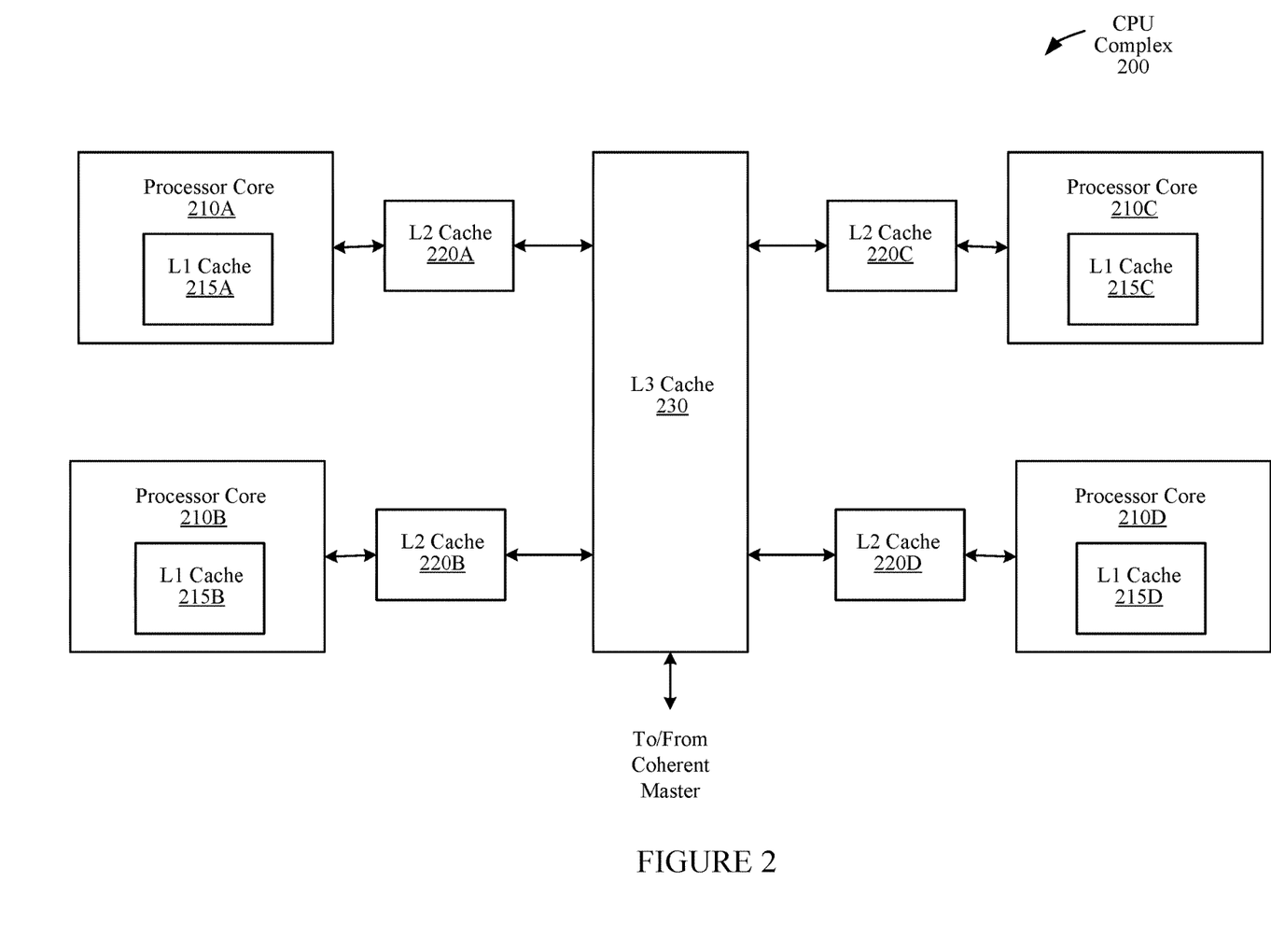
FIG. 2 is a block diagram of one embodiment of a core complex.
Figure 3:
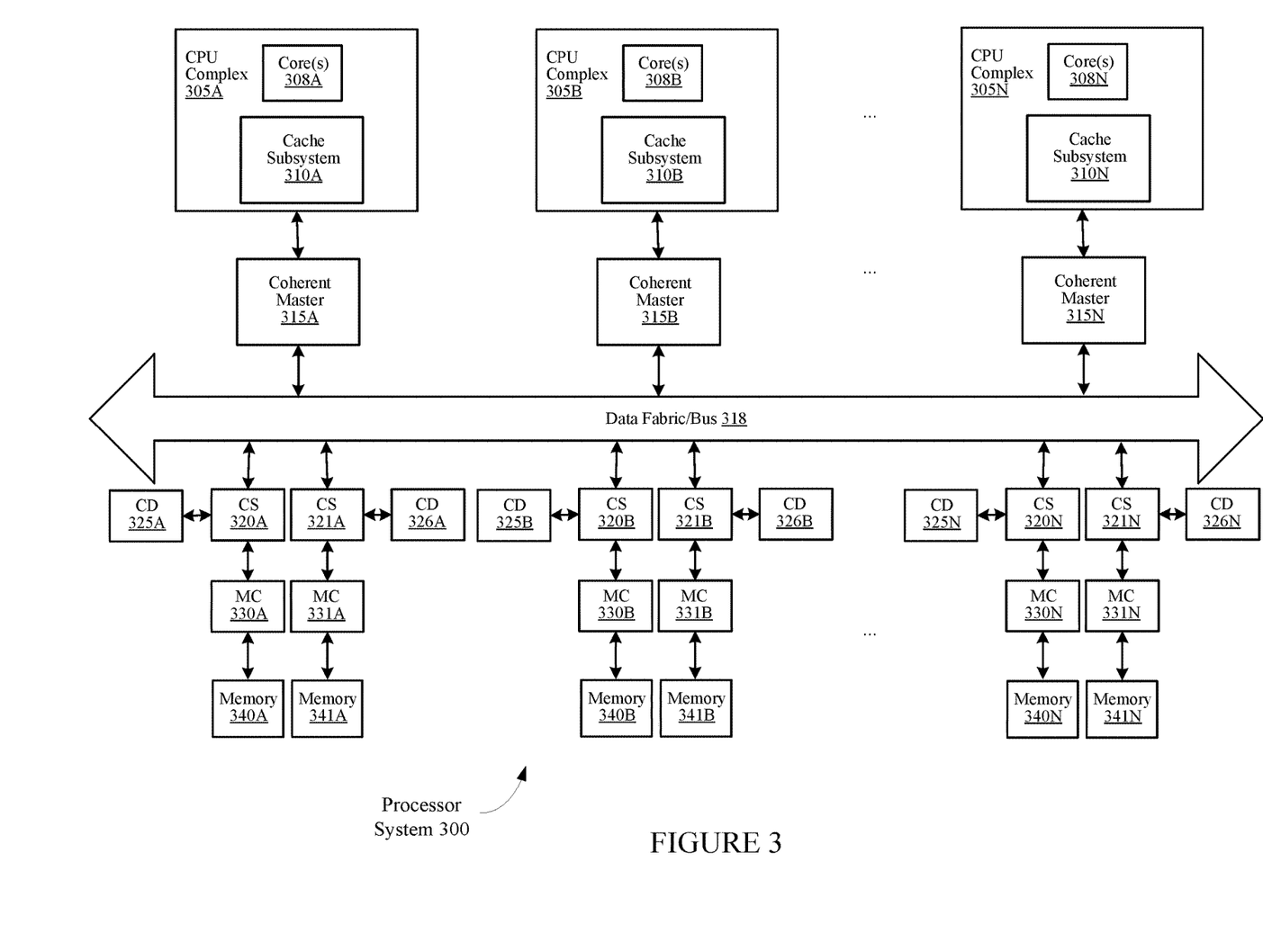
FIG. 3 is a block diagram of one embodiment of a multi-CPU processor system.

In one embodiment, each CPU subsystem 105A-N may include various components, such as a coherent master (e.g., coherent master 315A of FIG. 3) to manage cache coherency and processing components, such as one or more processor cores master (e.g., core(s) 308A of FIG. 3) or other specialized processing components. Each processor core within CPU subsystem 105A-N includes a cache subsystem with one or more levels of caches connect to the coherent master. In one embodiment, the cache subsystem includes a shared cache connected to each CPU subsystem 105A-N (e.g., L3 cache 230 of FIG. 2). In some embodiments, one or more CPU subsystems 105A-N may include a data parallel processor with a highly parallel architecture, such as one or more of graphics processing units (GPUs), digital signal processors (DSPs), field programmable gate arrays (FPGAs), application specific integrated circuits (ASICs), and so forth. As used herein a "core complex" can also be referred to as a "processing node" or a "CPU".

In one embodiment, home node(s) 130 may include one or more of a coherent slave, a cache directory, and a memory controller coupled to any number and type of memory devices (not shown). For example, the memory device(s) coupled to home node(s) 130 may include Dynamic Random Access Memory (DRAM), Static Random Access Memory (SRAM), NAND Flash memory, NOR flash memory, Ferroelectric Random Access Memory (FeRAM), or others.

In various embodiments, each home node 130A-N and each CPU subsystem 105A-N includes logic to communicate with one another to send probes, acknowledgments, and move data, such as cache line or cache region data, to requesting locations and to memory, among other things. For example, CPU subsystem 105A may exchange signals with the home node 130N to process a dirty cache line eviction.

I/O interfaces 120 are representative of any number and type of I/O interfaces, for example but not limited to the various types of peripheral component interconnect (PCI) buses, gigabit Ethernet (GBE) bus, universal serial bus (USB), specialty processors (e.g., platform security processors, graphics processors), and system management logic. Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various embodiments, computing system 100 can be a server, desktop computer, laptop, mobile device, game console, streaming device, wearable device, or any of various other types of computing systems or devices. The number, orientation, and type of components illustrated in computing system 100 is by way of example only and can vary from embodiment to embodiment based on application and system architecture.

FIG. 2 is a block diagram of one embodiment of a CPU complex 200, for example, that may be found within the CPU subsystems 105A-N of FIG. 1. CPU complex 200 may include four processor cores 210A-D and a cache subsystem including L1 cache 215A-D, L2 cache 220A-D, and an L3 cache 230. In one embodiment of the CPU complex 200, the cache subsystem includes high-speed cache memories (e.g., L1 cache 215A-D, L2 cache 220A-D, and an L3 cache 230) configured to store blocks of data (not shown). As used herein, a "block" is a set of bytes stored in contiguous memory locations within the cache memories, which are treated as a unit for coherency purposes. Additionally, each of the terms "cache block", "block", "cache line", and "line" is interchangeable herein. In some embodiments, a block can also be the unit of allocation and deallocation in a cache. A block may be retrieved from other caches within the system, such as from other core complexes (e.g., CPU subsystems 105A-N of FIG. 1), or from the main memory, for example as may be retrieved through home node 130A of FIG. 1.

Additionally, in one embodiment, the L3 cache 230 is shared by each of the processor cores 210A-D. L3 cache 230 is coupled to a coherent master (not shown) for access to the data fabric (e.g., data fabric/bus 125 of FIG. 1) and memory subsystem. In other embodiments, CPU complex 200 may include fewer or more processor cores (e.g., processor core 210A) and corresponding L2 caches (e.g., L2 cache 220A). In yet other embodiments, CPU complex 200 may include other types of addressable cache subsystems that may include different numbers, types, and levels of cache memories without departing from the novelty of this disclosure.

In one embodiment, an L2 or L3 cache (e.g., L2 cache 220A or L3 cache 230) exchanges signaling with the coherent master (not shown) to evict a dirty cache line (victim) from the cache. During this process, after the cache forwards the victim to the coherent master and each acknowledge their respective task is complete (e.g., see FIG. 5) the cache then purges the victim from its memory and is ready to receive a new cache line entry while the coherent master and home node complete the eviction process.

FIG. 3 is a block diagram of one embodiment of a processor system 300. In one embodiment, processor system 300 includes multiple core complexes as illustrated by CPUs 305A-N. In various embodiment, the number of CPUs (e.g., CPU complex 305A) and number of cores (e.g., cores 308A-N) per CPU may vary according to design choice. Each CPU 305A-N also includes a corresponding cache subsystems 310A-N. In various embodiments, the cache subsystems 310A-N may vary in size and structure as described above with reference to FIG. 2.

In one embodiment, each CPU 305A-N is connected to a corresponding coherent master 315A-N that is further connected to a data fabric/bus 318. As used herein, a "coherent master" is defined as an agent that processes traffic flowing over an interconnect (e.g., data fabric/bus 318) and manages cache coherency, which includes each coherent master (e.g., coherent masters 315A-N) working in concert to generate, receive, and process coherency-related messages and probes for synchronizing copies of shared cache line data within processor system 300.

In various embodiments, each CPU 305A-N may be connected to one or more coherent slaves by a corresponding coherent master 315A-N and data fabric/bus 318. Coherent slave 320A is connected to memory controller (MC) 330A and cache directory (CD) 325A, while coherent slave 321A is coupled to memory controller 331A and cache directory 326A. Each memory controller 330A-N and 331A-N is connected to a respective one of the memory devices 340A-N and 341A-N. One of the functions of each memory controller, such as memory controller 330A, is to provide the elements of the processor system 300 access to the memory devices 340A-N and 341A-N. In various embodiments, although shown as one block, each of the memory devices 340A-N and 341A-N may be a composed of one or more physical memories and may be of any type suitable for storing data, such as Dynamic Random Access Memory (DRAM), Static Random Access Memory (SRAM), etc.

In various embodiments, a coherent slave (e.g., a coherent slave 320A-N) is responsible for reading out memory (e.g., a memory 340A-N) through an attached memory controller (e.g., a memory controller 330A-N) and managing cache coherence through a cache directory (e.g., a cache directory 325A-N).

In one embodiment, similar to the cache subsystem 310A, the coherent master 315A sends the victim through a non-blocking virtual channel within the data fabric/bus 318 to the coherent slave 320A. The coherent slave 320A prioritizes the execution of the victim based on the use of the non-blocking virtual channel and sends the victim to the memory controller 330A to be written to the memory 340A while contemporaneously sending another globally visible response back to the coherent master 315A to indicate the transaction is complete (e.g., see FIG. 5). This indicates to the coherent master 315A that it may purge the victim data from its buffer while maintaining the victim command. Similarly, once the victim is sent to the memory controller 330A, in the case of a dirty cache line victim, the coherent slave 320A may purge the victim from its buffer and move on to other transactions to the same addresses. The timing and order of the signaling in addition to the prioritized channel(s) reduces transaction resources and buffer occupancy of data and commands at the cache subsystem 310A and at the coherent slave 320A, which results in an increase in system speed and efficiency. For convenience, components described herein such as the cache subsystems, coherent masters and at the coherent slaves are discussed as including a single buffer for command data and cache data. However, in other embodiments, each component may have two or more buffers shared with or dedicated to different types of data, such as command data and cache data (e.g., victim data).

In other embodiments, the asynchronous eviction transaction using a non-blocking virtual channel utilizes system-wide hazard checks (e.g., race condition) to ensure other data coherency. For example, prior to executing an eviction transaction, a coherent slave (e.g., a coherent slave 320A-N) must perform hazard checks on address-matching transactions, such as memory reads or coherency probes associated with the same cache line data to ensure those transactions get the most current data. Hazard check transactions are discussed in further detail below with respect to FIGS. 7A and 7B.

Although not shown in FIG. 3, in other embodiments there may be other connections from data fabric/bus 318 to other components not shown to avoid obscuring the figure. For example, in another embodiment, data fabric/bus 318 includes connections to one or more I/O interfaces and one or more I/O devices, such as shown in FIG. 1.

Figure 4:
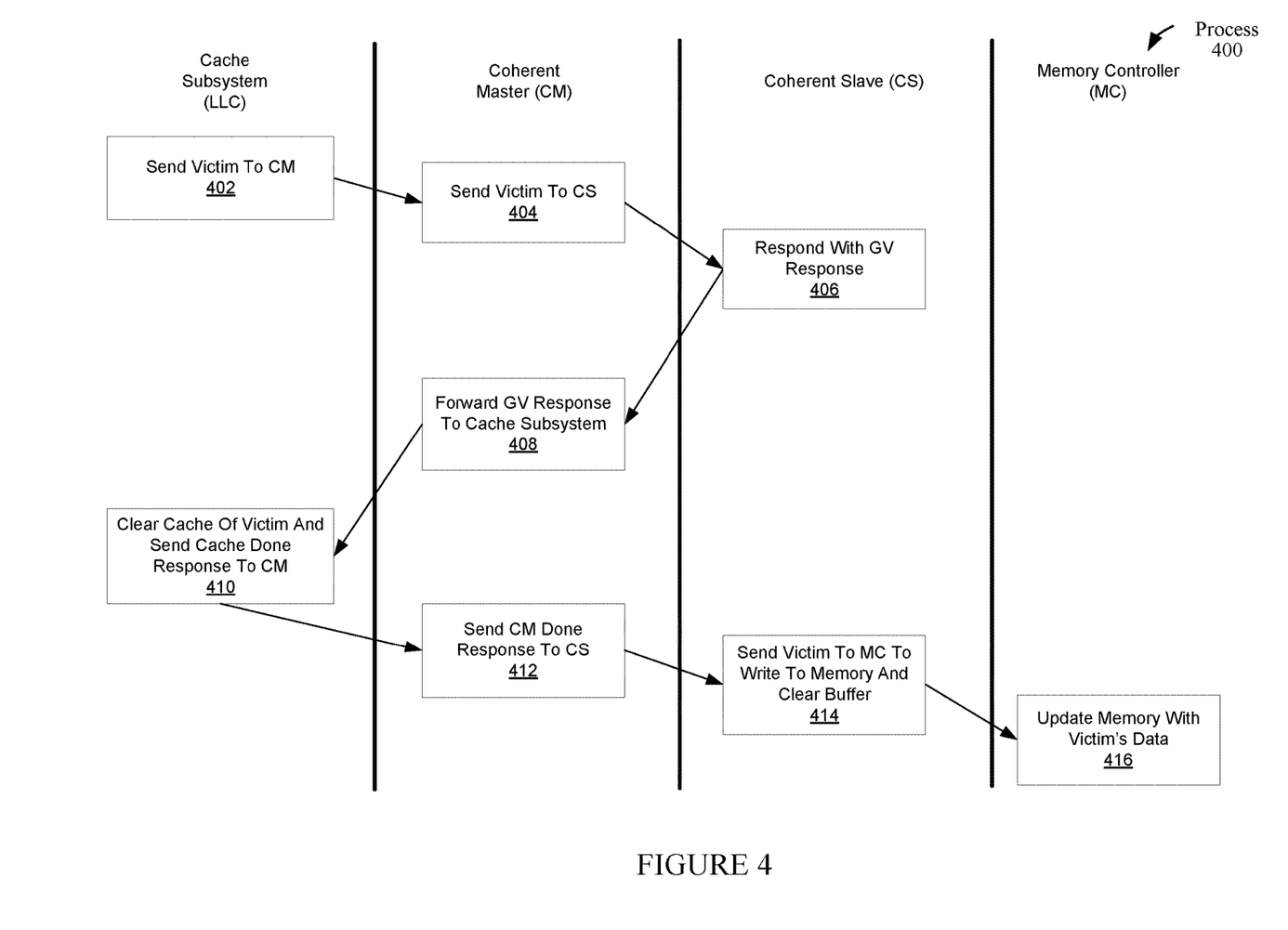
FIG. 4 is a flow diagram illustrating a process for performing a dirty cache line eviction.

FIG. 4 is a flow diagram illustrating a process 400 for performing a dirty cache line eviction. The process 400 begins at block 402 when the lower level cache (LLC) of a cache subsystem (e.g., cache subsystem 310A of FIG. 3 and L2 Cache 220A and L3 Cache 230 of FIG. 2) initiates a dirty cache line eviction, for clarity, the dirty cache line data is called a victim in this diagram. The victim gets forwarded to the coherent master (CM) (e.g., coherent master 315A of FIG. 3), which then at block 404 sends it to the coherent slave (CS) (e.g., coherent slave 320A of FIG. 3). The coherent slave may have to process other transactions to the same address, but eventually the victim transaction will become the oldest transaction to that address corresponding to the victim data. The coherent slave will then, at block 406, indicate to the coherent master that this transaction is now globally visible (GV) with a GV response. When the coherent master receives the GV response, it sends the GV response to the cache subsystem at block 408. The victim remains and occupies space in the cache subsystem until, at block 410, it receives the GV response and it may then clear the victim and send an cache done response packet to the coherent master, which provides indication that the coherent master no longer needs to maintain the coherency state. The coherent master then translates the cache done response to a CM done response packet and sends it to the coherent slave at block 412. When this packet arrives in the coherent slave, at block 414, the coherent slave then sinks the victim to the memory controller, clears its buffer, and the transaction is complete. Lastly, at block 416, the memory controller receives the victim data and updates the memory address location accordingly.

The process of the transaction illustrated in FIG. 4 occupies resources at both the cache subsystem and the coherent slave to preserve the correctness of the cache coherency. The lifetime of this transaction greatly increases based on the distance between the cache subsystem and the coherent slave, and how the system prioritizes data. So, for example in a processor system (e.g., processor system 300 of FIG. 3), that has multiple sockets with multiple cache subsystems, coherent masters and coherent slaves, the transactions may have to go through several switches to get from the cache subsystem to the coherent slave and back (e.g., see respective components A-N in FIG. 3) and may be blocked behind other transactions. The bigger the system, the longer those components hold on to portions of the eviction transaction and thus, the more the buffer and command occupancy pressure on those components that results in bottlenecks affecting performance.

Figure 5:
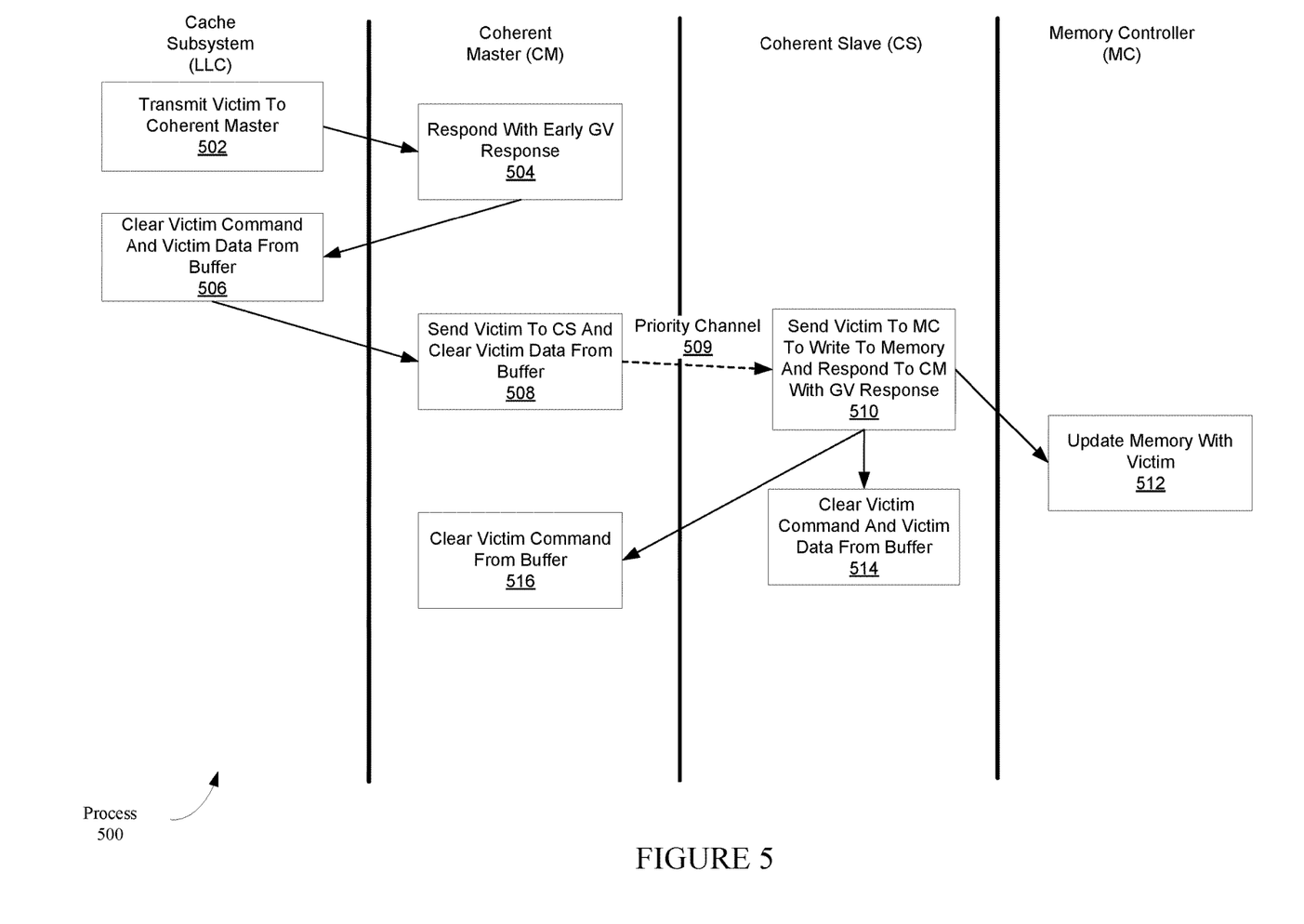
FIG. 5 is a flow diagram illustrating one embodiment of a process for reducing occupancy pressure and bottlenecks in a processor system.

FIG. 5 is a flow diagram of process 500 illustrating one embodiment of a method to reduce occupancy pressure and bottlenecks in a processor system (e.g., processor system 300 of FIG. 3). At block 502, the cache line eviction begins when the lower level cache (LLC) of a cache subsystem (e.g., cache subsystem 310A of FIG. 3 and L2 Cache 220A and L3 Cache 230 of FIG. 2) initiates a cache line eviction and sends the cache line (victim) to the coherent master (CM) (e.g., coherent master 315A of FIG. 3). The moment this victim comes in, at block 504, the coherent master immediately sends an early GV response transferring the ownership of the victim transaction from the cache subsystem (LLC) to the coherent master. The cache subsystem after receiving the early GV response, at block 506, returns a "cache done" response to the coherent master, clears the victim data and command from the LLC buffer, and is released for processing the next transaction. At block 508 the coherent master sends the victim to the coherent slave over priority channel 509 and clears the victim data from the coherent master buffer.

In one embodiment, the priority channel 509 is a non-blocking virtual channel. A priority channel, such as a non-blocking virtual channel, for example, is utilized because the victim may not be the oldest transaction to the victim's particular address, which means that a victim could have piled up behind other transactions to the same address or somewhere in between in the processor system.

In one embodiment, the coherent slave, upon receiving data on the prioritized channel 509, guarantees forward progress on the victim over other transactions, this means, for example, the coherent slave does not delay the victim based on other functions, such as address compare, address matching checks, or any other processing that may delay the progress of the victim. At block 510, the coherent slave prioritizes the cache line eviction data and sends, or sinks, it to the memory controller (e.g., memory controller 330A of FIG. 3) to update the memory with the victim at block 512. Returning to block 510, the coherent slave also sends back a GV response to the coherent master and clears its buffer completing the transaction at the coherent slave. At block 514, the coherent slave clears the victim command and the victim data from its buffer. At block 516, the coherent master receives the GV response indicating the coherent slave has completed the transaction and clears the victim command from the buffer.

Figure 6:
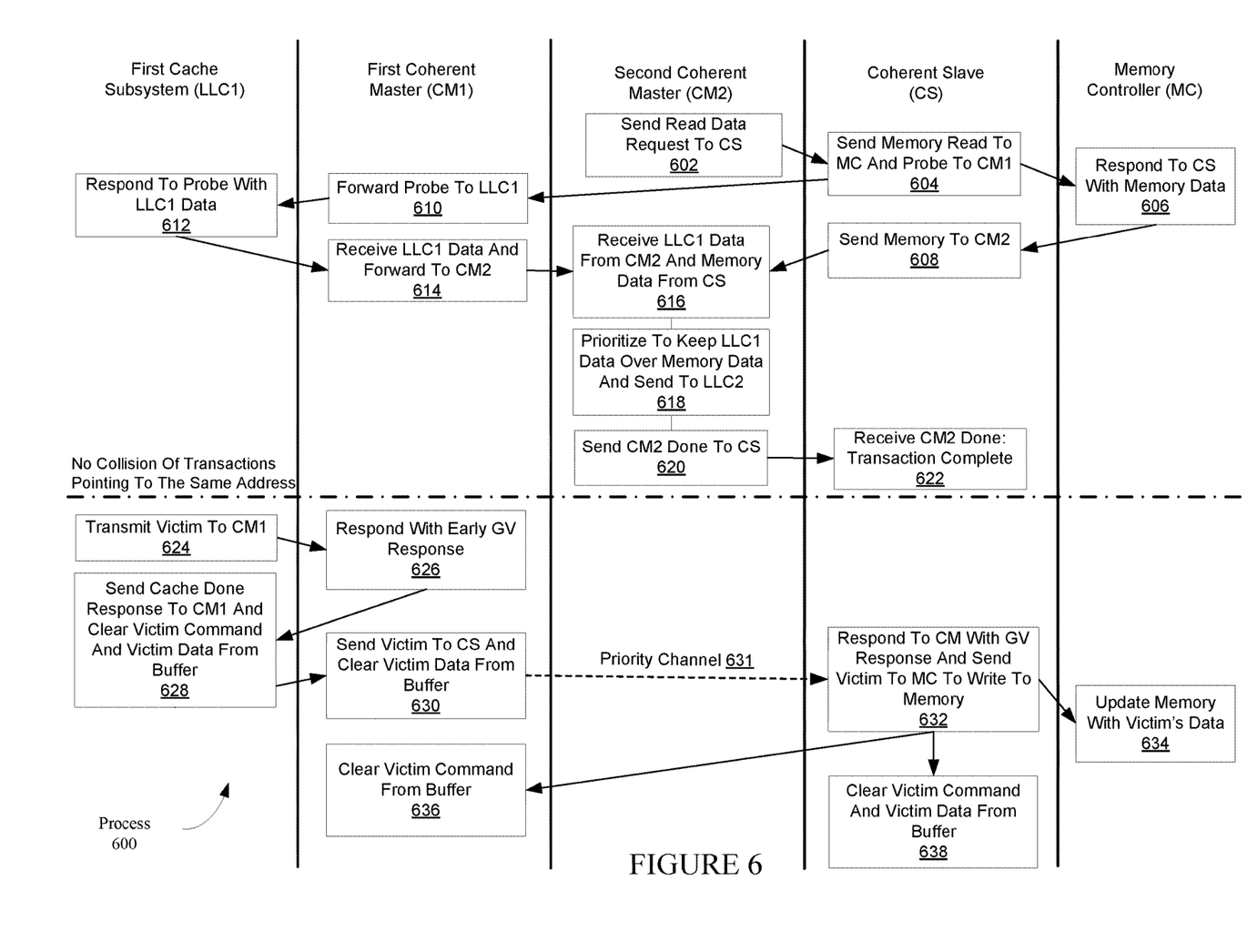
FIG. 6 is a flow diagram illustrating one embodiment of a process for reducing occupancy pressure in a processor system when there is no overlap between an eviction and another transaction to the same address.

FIG. 6 is a flow diagram illustrating one embodiment of a process for reducing occupancy pressure in a processor system (e.g., processor system 300 of FIG. 3) when there is no overlap between an eviction and another transaction to the same address. In this example embodiment, there is an eviction of a cache line (victim) to complete at a first CPU complex and first coherent master (e.g., CPU complex 305A and coherent master 315A of FIG. 3) while at substantially the same time a second CPU complex and second coherent master (e.g., CPU complex 305N and coherent master 315N of FIG. 3) wants to read the same cache line. This process begins at block 602 where the second coherent master (CM2) sends a read data request to the coherent slave (CS) (e.g., coherent slave 321A of FIG. 3) corresponding to that address associated with the cache line set for eviction. The coherent slave, at block 604, sends a memory read request to the memory controller (MC) (e.g., memory controller 331A of FIG. 3) and in response the memory controller, at block 606, sends back the memory data. At block 608, the coherent slave forwards the received memory data to the second coherent master that made the initial request in block 602.

Returning to block 604, the coherent slave, concurrent to sending the memory read request, also sends out one or more probes looking for cache line data that corresponds to the memory address. In this example, just one probe is sent to the first coherent master (CM1) that receives the probe at block 610 and forwards it to the first cache subsystem (LLC1) (e.g., cache subsystem 310A of FIG. 3 and L2 Cache 220A and L3 cache 230 of FIG. 2). The probe is a hit and the first cache subsystem responds, at block 612, to the probe with LLC1 data back to the first coherent master. The first coherent master at block 614 forwards the LLC1 data to the second coherent master that initiated the probe through the request to the coherent slave at block 602.

The second coherent master, at block 616, receives the LLC1 data from the first coherent master and the memory data from the coherent slave. At block 618, the coherent master prioritizes to keep the LLC1 data over the memory data that is determined to be older than the cache line data, and sends the LLC1 data to its associated second cache subsystem (LLC2)(not shown). In various embodiments the prioritization may be based on a byte by byte comparison of the data, by a flag (e.g., state bit(s)), or the like. At block 620 the second coherent master sends a CM2 done message to the coherent slave that, at block 622, receives the CM2 done message and completes the transaction.

With the probe transaction to the cache line complete, the process 600 can continue to process the eviction of that cache line like that of process 500 of FIG. 5. The cache line eviction begins, at block 624, when the cache subsystem initiates a cache line eviction and sends the victim (cache line eviction data) to the first coherent master. Then at block 626, the coherent master sends an early GV response transferring the ownership of the victim transaction from the first cache subsystem to the first coherent master. The first cache subsystem after receiving the early GV response, at block 628, returns a cache done response to the first coherent master, clears the victim data and command from the LLC buffer and is released for processing the next transaction. At block 630 the first coherent master sends the victim to the coherent slave over priority channel 631 and clears the victim data from the coherent master buffer.

In one embodiment, the priority channel 631 is a non-blocking virtual channel. A priority channel, such as a non-blocking virtual channel, for example, is utilized because the victim may not be the oldest transaction to the victim's particular address, which means that a victim could have piled up behind other transactions to the same address or somewhere in between in the processor system.

In one embodiment, the coherent slave, upon receiving data on the prioritized channel 631, guarantees forward progress on the victim over other transactions, this means, for example, the coherent slave does not delay the victim based on other functions, such as address compare, address matching checks, or any other processing that may delay the progress of the victim. At block 632, the coherent slave priority to the victim transaction and sends, or sinks, it to the memory controller to update the memory with the victim at block 634. Returning to block 632, the coherent slave also sends back a GV response to the first coherent master and clears its buffer completing the transaction at the coherent slave at block 634. At block 636, the first coherent master receives the GV response indicating the coherent slave has completed the transaction and clears the victim command from the buffer. At block 638, the coherent slave clears the victim command and the victim data from its buffer.

Figure 7A:
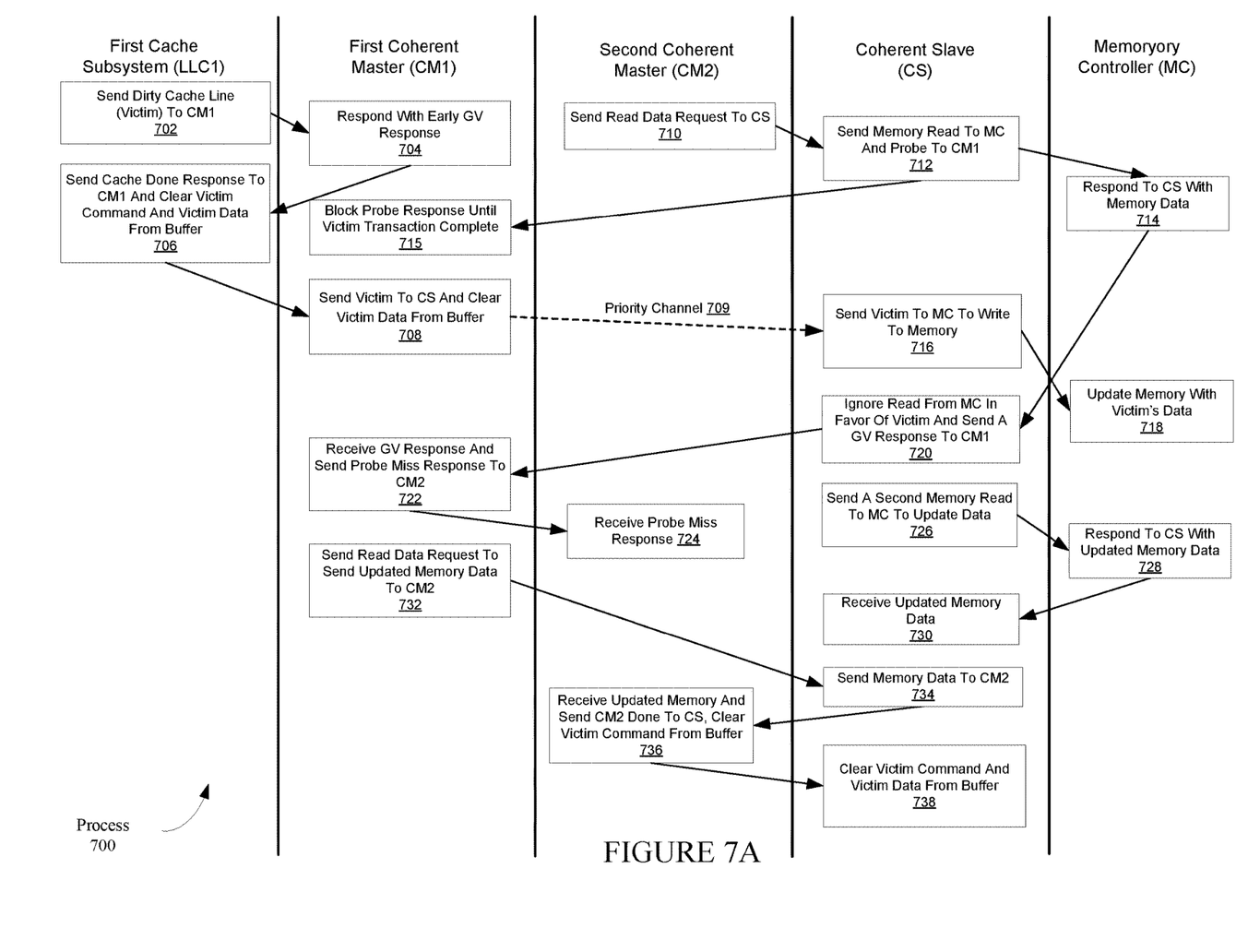
FIG. 7A is a flow diagram illustrating a process for reducing occupancy pressure in a processor system when a probe is received at a coherent master prior to a dirty cache line eviction transaction to the same address completing, according to an embodiment.

FIG. 7A is a flow diagram of process 700 illustrating one embodiment of a method to reduce occupancy pressure in a processor system (e.g., processor system 300 of FIG. 3) when a probe is received at a coherent master prior to a dirty cache line eviction transaction to the same address completing. In this example embodiment, similar to the process 600 of FIG. 6, there is a dirty cache line eviction of a cache line (victim) to complete at a first CPU complex and first coherent master (e.g., CPU complex 305A and coherent master 315A of FIG. 3) while at substantially the same time a second CPU complex and second coherent master (e.g., CPU complex 305N and coherent master 315N of FIG. 3) wants to read the same cache line. However, in this example, the probe reaches the first coherent master before the dirty cache line eviction transaction is complete.

The process 700 begins, at block 702, when the cache subsystem initiates a dirty cache line eviction and sends the victim to the first coherent master. Then at block 704, the coherent master sends an early GV response indicating ownership of the victim and that the transaction has transferred from the first cache subsystem to the first coherent master. The first cache subsystem after receiving the early GV response, at block 706, returns a cache done response to the first coherent master, clears the victim data and command from the LLC buffer and is released for processing the next transaction. At block 708, the first coherent master sends the victim to the coherent slave over priority channel 709 and clears the victim data from the coherent master buffer.

However, prior to the sending of the victim to the coherent slave the second coherent master (CM2) sends a read data request, at block 710, to the coherent slave (CS) (e.g., coherent slave 321A of FIG. 3) corresponding to that address associated with the dirty cache line eviction. The coherent slave, at block 712, sends a memory read request to the memory controller (MC) (e.g., memory controller 331A of FIG. 3) and in response the memory controller, at block 714, sends back the memory data.

Returning to block 712, the coherent slave, concurrent to sending the memory read request, also sends out one or more probes looking for cache line data that corresponds to the memory address. In this example, just one probe to the first coherent master (CM1) that receives the probe at block 715. In one embodiment, because there was an early GV response prior, at block 704, the first coherent master has knowledge of the priority channel eviction transaction and will block the probe response until the eviction transaction is complete. In other embodiments there may be other signalling or flags set to indicate a probe block. In yet another embodiment, if in the event the first coherent master receives an address matching probe before the early GV response at block 704, the first coherent master allows for the victim to use the conventional flow of execution and does not perform any early GV responses.

At block 716, the coherent slave receives the victim over the prioritized channel 709, the coherent slave gives priority to the victim transaction and sends, or sinks, it to the memory controller to update the memory with the victim at block 718. At block 720, the coherent slave ignores the memory data received from the memory controller because it also holds a victim to the same address, which by definition is the latest data corresponding to that address. The coherent slave also sends back a GV response to the first coherent master. At block 722, the first coherent master receives the GV response indicating the coherent slave has completed the victim transaction and releases its probe miss response to the second coherent master (the original data requestor at block 710) since the victim is no longer available after it was sent to the coherent slave at block 708.

Concurrently, the coherent slave, at block 726, sends a second memory read request to the memory controller and in response, the memory controller at block 728 sends back the updated memory data, which is received by the coherent slave at block 730. The first coherent master, at block 732, sends a read data request indicating to the coherent slave that the second coherent master should receive the updated data from memory. At block 734, the coherent slave sends the updated data from memory to the second coherent master, which at block 736, receives the updated data, sends a CM2 done response back to the coherent slave, and clears the victim command from the buffer. The coherent slave, at block 738, clears the victim command and the victim data from its buffer. In another embodiment, the coherent slave directly forwards the data from the victim at block 734 in response to the read request at block 732, thus avoiding the second memory read process at blocks 726-730.

Figure 7B:
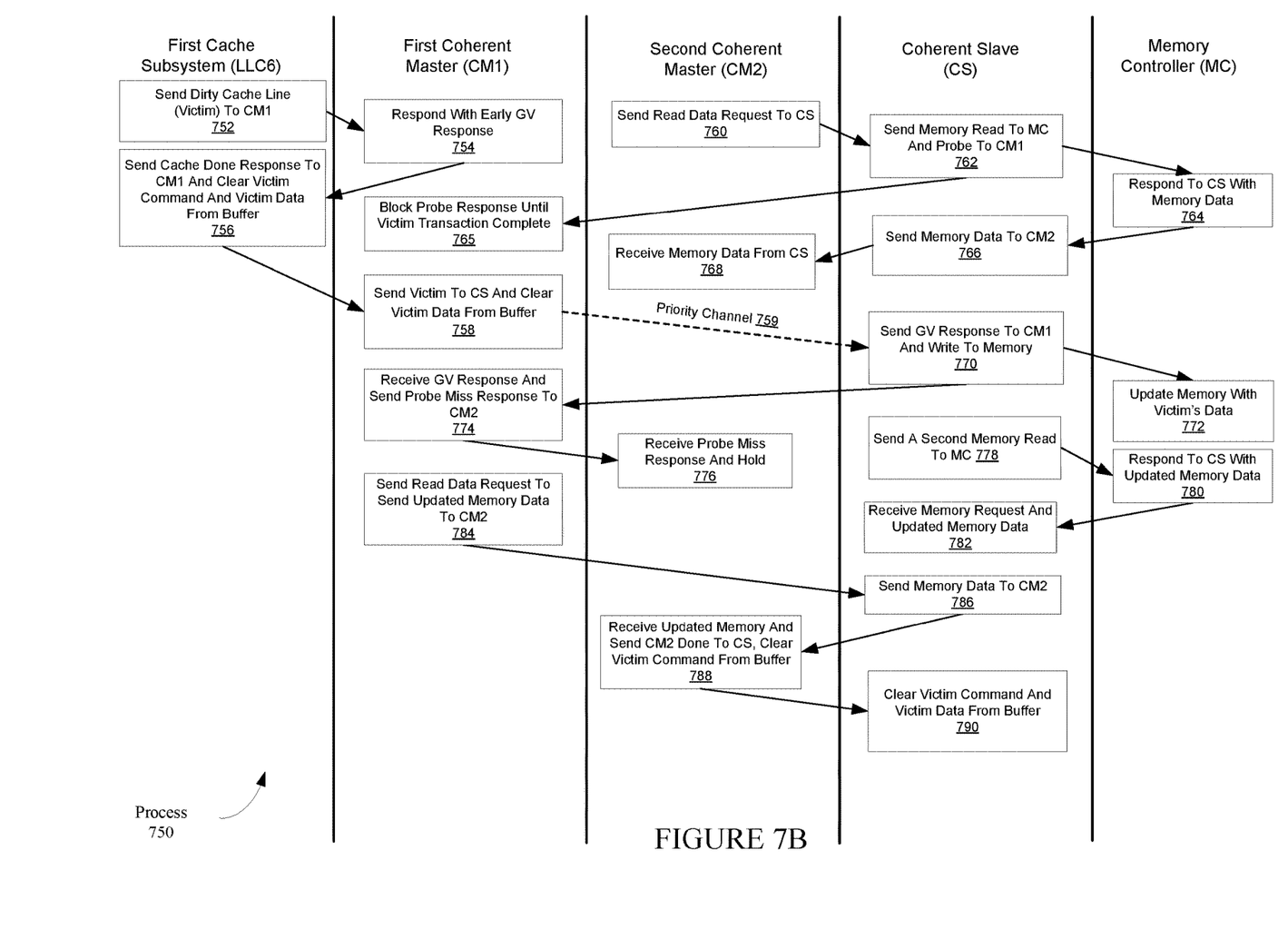
FIG. 7B is a flow diagram illustrating a process for reducing occupancy pressure in a processor system when a probe is received at coherent master prior to a dirty cache line eviction transaction to the same address completing, according to an embodiment.

FIG. 7B is a flow diagram of process 750 illustrating one embodiment of a method to reduce occupancy pressure in a processor system (e.g., processor system 300 of FIG. 3) in a second scenario when a probe is received at coherent master prior to a dirty cache line eviction transaction to the same address completing. In this example embodiment there is a dirty cache line eviction of a cache line (victim) to complete at a first CPU complex and first coherent master (e.g., CPU complex 305A and coherent master 315A of FIG. 3) while at substantially the same time a second CPU complex and second coherent master (e.g., CPU complex 305N and coherent master 315N of FIG. 3) wants to read the same cache line. However, in this example, both the probe reaches the first coherent master and the first read memory reaches the second coherent master before the dirty cache line eviction transaction is complete.

The process 750 begins, at block 752, when the cache subsystem initiates a dirty cache line eviction and sends the victim (cache line eviction data) to the first coherent master. Then at block 754, the coherent master sends an early GV response indicating ownership of the victim and that the transaction has transferred from the first cache subsystem to the first coherent master. The first cache subsystem after receiving the early GV response, at block 756, returns a cache done response to the first coherent master, clears the victim data and command from the LLC buffer and is released for processing. At block 758, the first coherent master sends the victim to the coherent slave over priority channel 759 and clears the victim data from the coherent master buffer.

However, prior to the sending of the victim to the coherent slave the second coherent master (CM2) sends a read data request, at block 760, to the coherent slave (CS) (e.g., coherent slave 321A of FIG. 3) corresponding to that address associated with the dirty cache line eviction. The coherent slave, at block 762, sends a memory read request to the memory controller (MC) (e.g., memory controller 331A of FIG. 3) and in response the memory controller, at block 764, sends back the memory data.

Returning to block 762, the coherent slave, concurrent to sending the memory read request, also sends out one or more probes looking for cache line data that corresponds to the memory address. In this example, just one probe is sent to the first coherent master (CM1) that receives the probe at block 765. In one embodiment, because there was an early GV response prior at block 754, the first coherent master has knowledge of the priority channel eviction transaction and will block the probe until the eviction transaction is complete. In other embodiments there may be others signalling or flags set to indicate a probe block.

At block 766, the coherent slave sends the memory data received from the memory controller to the second coherent master, which is received at block 768. However, the victim with the updated data has not been received yet at the coherent slave resulting in the second coherent master receiving stale data, which must be resolved in the process 750 by the first coherent master that owns the victim transaction.

At block 770, the coherent slave receives the victim over the prioritized channel 759, gives priority to the victim transaction and sends, or sinks, it to the memory controller to update the memory with the victim at block 772. Additionally, at block 770, the coherent slave sends a GV response to the first coherent master indicating the coherent slave has completed the victim transaction. The first coherent master receives the GV Response, at block 774, and releases its probe miss response to the second coherent master (the original data requestor at block 760), which is received at block 776.

Concurrently, the coherent slave, at block 778, sends a second memory read request to the memory controller and in response, the memory controller at block 780 sends back the updated memory data, which is received by the coherent slave at block 782. The first coherent master, at block 784, sends a read data request indicating to the coherent slave that the second coherent master should receive the updated data from memory. At block 786, the coherent slave sends the updated data from memory to the second coherent master, which at block 788, receives the updated data, sends a CM2 done response back to the coherent slave, and clears the victim command from the buffer. The coherent slave, at block 790, the coherent slave clears the victim command and the victim data from its buffer.

There may be other hazards that arise in the signaling between the coherent slave (e.g., coherent slave 320A of FIG. 3) and one or more coherent masters (e.g., coherent master 315A and 315B of FIG. 3) during a dirty cache line eviction. Even within these hazards, various embodiments utilize the priority channel and early GV responses, as detailed above, for ensuring the most recent copy of the cache line is provided to the requestor with minimal bottlenecks.

For each hazard the coherent master(s) and the coherent slave uses interlocks to ensure that the most recent copy of the cache line is delivered and the process does not stall. For example, a probe may be seen after the victim is processed through the coherent slave to memory (e.g., memory 340A of FIG. 3). In this scenario, the cache subsystem (e.g., cache subsystem 310A of FIG. 3) has already completed the victim transaction and the first coherent master has pushed the victim to the coherent slave. However, prior to the arrival of the victim, the coherent slave has received a read to the same address from a second coherent master and has sent coherency probes to the first coherent master that has sent the victim. If this race is not handled correctly, the cache subsystem requesting the read data will get stale data from memory. To resolve this, according to one embodiment, the coherent slave detects the race condition and indicates a hazard by informing the first coherent master that a race condition has been detected. The first coherent master responds by holding the victim and waiting until it receives the coherency probe. Once the probe is received, the first coherent master informs the coherent slave that the coherency probe missed and requests another read from memory to be sent to the second coherent master.

Another hazard that may arise is when the coherent slave has received a read to the same address from the second coherent master and has sent coherency probes to the first coherent master, but the coherency probe is received at the first coherent master and completes with a probe response prior to the victim being received and processed at the coherent slave. This may lead to a false race detection in the coherent slave. In this case, according to one embodiment, the coherent slave releases the hold on the victim if it gets an indication the second coherent master has completed instead of waiting for a request for another memory read to be sent to the second coherent master.

A method for processing a cache line eviction transaction may include receiving cache line eviction data from a cache subsystem and processing the received cache line eviction data over a prioritized channel.

The method may also include, prior to processing the cache line eviction data, releasing the cache subsystem for processing other transactions after the receiving the cache line eviction data.

In the method, processing the cache line eviction data may include processing the cache line eviction data before processing lower priority transactions and updating a memory by writing the cache line eviction data to the memory at a memory address associated with the cache line eviction data.

The method may also include, prior to the processing of the cache line eviction data, processing a coherency probe for cache line data corresponding to the memory address associated with the cache line eviction data, the coherency probe originating from a request for the cache line data from a coherent master, and delaying sending a coherency probe response until after the processing of the cache line eviction data.

The method may also include, after sending of the coherency probe response, requesting data from memory to provide the updated cache line data to the coherent master.

The method may also include, after sending of the coherency probe response, forwarding the cache line eviction data to the coherent master.

The method may also include, after the processing of the cache line eviction data, holding the cache line eviction transaction based on an indication of a hazard condition, after the processing of the cache line eviction data, processing a coherency probe for cache line data corresponding to the memory address associated with the cache line eviction data, the coherency probe originating from a request for the cache line data from a coherent master, and requesting data from memory to provide the updated cache line data to the coherent master based on a probe miss response.

The method may also include, prior to the receiving of the cache line eviction data the cache subsystem, processing a coherency probe for cache line data corresponding to the memory address associated with the cache line eviction data, the coherency probe originating from a request for the cache line data from a coherent master, receiving, at the coherent master, a probe response with the cache line data, and after the processing of the cache line eviction data at the coherent slave, holding the cache line eviction data until the coherent master receives the cache line eviction data and releasing the hold on the cache line eviction data to complete the cache line eviction transaction.

An apparatus to process a cache line eviction transaction may include a first coherent master to receive cache line eviction data from a cache subsystem corresponding to the first coherent master and to communicate the cache line eviction data to a coherent slave over a prioritized channel, and the coherent slave to process the cache line eviction data based on the receipt of the cache line eviction data over the prioritized channel.

In the apparatus, the first coherent master may be configured to, after receiving the cache line eviction data and before communicating the cache line eviction data to the coherent slave, communicate a response to the cache subsystem indicating ownership of the cache line eviction transaction to release the cache subsystem of the cache line eviction transaction.

In the apparatus, the coherent slave may process the cache line eviction data by communicating the cache line eviction data to a memory controller to update a memory address location corresponding to the cache line eviction data, and may communicate a response to the first coherent master to indicate the cache line eviction transaction is complete to release the first coherent master of the cache line eviction transaction.

In the apparatus, the first coherent master, prior to the communicating of the cache line eviction data to the coherent slave, may receive a coherency probe for cache line data corresponding to the memory address associated with the cache line eviction data, where the coherency probe originated from a request for the cache line data from a second coherent master. In the apparatus, the first coherent master, in response to the coherency probe and the receiving of the cache line eviction data, may delay a coherency probe response until after the coherent slave processes the cache line eviction data.

In the apparatus, the first coherent master may communicate a probe miss to the second coherent master, and the first coherent master may communicate a read data request to the coherent slave to provide updated cache line data corresponding to the cache line eviction data to the second coherent master.

In the apparatus, the first coherent master, after the coherent slave processes the cache line eviction data, may receive a command to hold the cache line eviction transaction based on an indication of a hazard condition, and may receive a coherency probe for cache line data corresponding to the memory address associated with the cache line eviction data, the coherency probe originating from a request for the cache line data from a second coherent master. The coherent master may communicate a probe miss to the second coherent master, and may communicate a read data request to the coherent slave to provide updated cache line data corresponding to the cache line eviction data to the second coherent master.

In the apparatus, prior to the receiving of the cache line eviction data from the cache subsystem, the first coherent master may receive a coherency probe for cache line data corresponding to the memory address associated with the cache line eviction data, the coherency probe originating from a request for the cache line data from a second coherent master. The first coherent master may communicate a probe response with the cache line data to the second coherent master, and after the processing of the cache line eviction data at the coherent slave, the first coherent master may receive a hold on the cache line eviction data. The second coherent master may receive the cache line eviction data from the coherent slave, and the first coherent master may release the hold on the cache line eviction data based on the transaction completing at the coherent slave.

In the apparatus, the first coherent master, after the coherent slave processes the cache line eviction data may receive a command to hold the cache line eviction transaction based on an indication of a hazard condition, determine the hazard condition is false, and release the hold on the transaction.

A method for processing a cache line eviction transaction may include receiving a request from a first CPU subsystem for cache line data associated with a memory address, communicating cache line eviction data corresponding to the memory address of the requested cache line data from a second CPU subsystem to a home node over a prioritized channel, processing the cache line eviction data received over the prioritized channel, detecting a hazard condition between the requested cache line data and the cache line eviction data, holding the cache line eviction data until the hazard condition clears, and communicating the cache line eviction data to the first CPU subsystem to complete the cache line eviction transaction.

In the method, detecting the hazard condition may include detecting the hazard condition at the second CPU subsystem based on receiving a probe requesting the cache line data before the communicating of the cache line eviction data to the home node, and at the second CPU subsystem and prior to the communicating the cache line eviction data, sending a request to the home node to provide updated cache line data corresponding to the cache line eviction data to the first core complex.

In the method, detecting the hazard condition may also include detecting the hazard condition at the home node based the second CPU subsystem receiving a probe requesting the cache line data after the processing of the cache line eviction data, and at the second CPU subsystem and prior to the communicating the cache line eviction data, sending a request to the home node to provide updated cache line data corresponding to the cache line eviction data to the first core complex.

In the method, detecting the hazard condition may further include detecting the hazard condition at the home node based the second CPU subsystem responding to a probe request for the cache line data with the cache line data before the processing of the cache line eviction data. Holding the cache line eviction data until the hazard condition clears may include holding the cache line eviction data at the second CPU subsystem until the head node communicates completion of cache line eviction transaction.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

We claim:

1. A method for processing a cache line eviction transaction, the method comprising:
   receiving cache line eviction data that was evicted from a cache subsystem;
   releasing the cache subsystem by clearing the cache line eviction data from a buffer of the cache subsystem, the cache subsystem released prior to the cache line eviction data being sent over a prioritized channel; and
   processing the cache line eviction data received over the prioritized channel by updating a memory with the cache line eviction data.

2. The method of claim 1, wherein the cache subsystem is released for processing other transactions after receiving the cache line eviction data.

3. The method of claim 1, wherein processing the cache line eviction data further comprises:
   processing the cache line eviction data before processing lower priority transactions; and
   updating the memory by writing the cache line eviction data to the memory at a memory address associated with the cache line eviction data.

4. The method of claim 3, further comprising:
   prior to processing the cache line eviction data, processing a coherency probe for cache line data corresponding to the memory address associated with the cache line eviction data, the coherency probe originating from a request for the cache line data from a coherent master circuit; and
   delaying sending a coherency probe response until after processing the cache line eviction data.

5. The method of claim 4, further comprising:
   after sending the coherency probe response, requesting data from the memory to provide updated cache line eviction data to the coherent master circuit.

6. The method of claim 4, further comprising:
   after sending the coherency probe response, forwarding the cache line eviction data to the coherent master circuit.

7. The method of claim 3, further comprising:
   after processing the cache line eviction data:
      holding the cache line eviction transaction based on an indication of a hazard condition;
      processing a coherency probe for cache line data corresponding to the memory address associated with the cache line eviction data, the coherency probe originating from a request for the cache line data from a coherent master circuit; and
      requesting data from the memory to provide updated cache line eviction data to the coherent master circuit based on a probe miss response.

8. The method of claim 3, further comprising:
   prior to receiving the cache line eviction data the cache subsystem,
      processing a coherency probe for cache line data corresponding to the memory address associated with the cache line eviction data, the coherency probe originating from a request for the cache line data from a coherent master circuit;
      receiving, at the coherent master circuit, a probe response with the cache line data; and
   after processing the cache line eviction data at a coherent slave circuit,
      holding the cache line eviction data until the coherent master circuit receives the cache line eviction data; and
      releasing the hold on the cache line eviction data to complete the cache line eviction transaction.

9. An apparatus to process a cache line eviction transaction, the apparatus comprising:
   a coherent master circuit to receive cache line eviction data that was evicted from a cache subsystem corresponding to the coherent master circuit and to communicate the cache line eviction data to a coherent slave circuit over a prioritized channel;
   the cache subsystem to clear the cache line eviction data from a buffer in connection with releasing the cache subsystem, the cache subsystem released prior to communication of the cache line eviction data over the prioritized channel; and
   the coherent slave circuit to process the cache line eviction data based on receipt of the cache line eviction data over the prioritized channel by updating a memory with the cache line eviction data.

10. The apparatus of claim 9, wherein:
    the coherent master circuit is configured to, after receiving the cache line eviction data and before communicating the cache line eviction data to the coherent slave circuit, communicate a response to the cache subsystem indicating ownership of the cache line eviction transaction to release the cache subsystem of the cache line eviction transaction.

11. The apparatus of claim 9, wherein the coherent slave circuit is further configured to process the cache line eviction data by:
    communicating the cache line eviction data to a memory controller to update a memory location corresponding to the cache line eviction data; and
    communicating a response to the coherent master circuit to indicate the cache line eviction transaction is complete to release the coherent master circuit of the cache line eviction transaction.

12. The apparatus of claim 9, wherein the coherent master circuit is configured to:
    prior to communication of the cache line eviction data to the coherent slave circuit, receive a coherency probe for cache line data corresponding to a memory address associated with the cache line eviction data, wherein the coherency probe originated from a request for the cache line data from an additional coherent master circuit; and
    in response to the coherency probe and receipt of the cache line eviction data, delay a coherency probe response until after the coherent slave circuit processes the cache line eviction data.

13. The apparatus of claim 12, wherein the coherent master circuit is configured to:

communicate a probe miss to the additional coherent master circuit; and
communicate a read data request to the coherent slave circuit to provide updated cache line data corresponding to the cache line eviction data to the additional coherent master circuit.

14. The apparatus of claim 9, wherein the coherent master circuit is configured, after the coherent slave circuit processes the cache line eviction data, to:
receive a command to hold the cache line eviction transaction based on an indication of a hazard condition;
receive a coherency probe for cache line data corresponding to a memory address associated with the cache line eviction data, the coherency probe originating from a request for the cache line data from an additional coherent master circuit;
communicate a probe miss to the additional coherent master circuit; and
communicate a read data request to the coherent slave circuit to provide updated cache line data corresponding to the cache line eviction data to the additional coherent master circuit.

15. The apparatus of claim 9, wherein:
prior to receiving the cache line eviction data from the cache subsystem, the coherent master circuit is configured to:
receive a coherency probe for cache line data corresponding to a memory address associated with the cache line eviction data, the coherency probe originating from a request for the cache line data from an additional coherent master circuit;
communicate a probe response with the cache line data to the additional coherent master circuit; and
after processing the cache line eviction data at the coherent slave circuit,
the coherent master circuit is configured to receive a hold on the cache line eviction data;
the additional coherent master circuit is configured to receive the cache line eviction data from the coherent slave circuit; and
the coherent master circuit is configured to release the hold on the cache line eviction data based on the cache line eviction transaction completing at the coherent slave circuit.

16. The apparatus of claim 9, wherein the coherent master circuit, after the coherent slave circuit processes the cache line eviction data, is configured to:
receive a command to hold the cache line eviction transaction based on an indication of a hazard condition;
determine the hazard condition is false; and
release the hold on the transaction.

17. A method for processing a cache line eviction transaction, the method comprising:
receiving a request from a first CPU subsystem for cache line data associated with a memory address;
communicating cache line eviction data corresponding to the memory address of the requested cache line data from a second CPU subsystem to a home node over a prioritized channel, wherein the cache line eviction data was evicted from a cache subsystem and the cache subsystem is released prior to communication of the cache line eviction data over the prioritized channel;
processing the cache line eviction data received over the prioritized channel by updating a memory with the cache line eviction data;
detecting a hazard condition between the requested cache line data and the cache line eviction data;
holding the cache line eviction data until the hazard condition is cleared; and
communicating the cache line eviction data to the first CPU subsystem to complete the cache line eviction transaction.

18. The method of claim 17, wherein detecting the hazard condition further comprises:
detecting the hazard condition at the second CPU subsystem based on receiving a probe requesting the cache line data before communicating the cache line eviction data to the home node; and
at the second CPU subsystem and prior to communication of the cache line eviction data, sending a request to the home node to provide updated cache line data corresponding to the cache line eviction data to a first core complex.

19. The method of claim 17, wherein detecting the hazard condition further comprises:
detecting the hazard condition at the home node based on the second CPU subsystem receiving a probe requesting the cache line data after the cache line eviction data is processed; and
at the second CPU subsystem and prior to communication of the cache line eviction data, sending a request to the home node to provide updated cache line data corresponding to the cache line eviction data to a first core complex.

20. The method of claim 17, wherein detecting the hazard condition further comprises:
detecting the hazard condition at the home node based on the second CPU subsystem responding to a probe request for the cache line data with the cache line data before the cache line eviction data is processed; and
holding the cache line eviction data until the hazard condition is cleared further comprises holding the cache line eviction data at the second CPU subsystem until the home node communicates completion of cache line eviction transaction.

* * * * *